(12) United States Patent
Johannesson et al.

(10) Patent No.: US 7,146,040 B2
(45) Date of Patent: Dec. 5, 2006

(54) AUTOMATIC WHITE BALANCE TECHNIQUE

(75) Inventors: Anders Johannesson, Lund (SE); Ingemar Larsson, Lund (SE)

(73) Assignee: Dialog Imaging Systems GmbH, Kirchheim/Teck-Nabern (DE)

( * ) Notice: Subject to any disclaimer, the term of this patent is extended or adjusted under 35 U.S.C. 154(b) by 721 days.

(21) Appl. No.: 10/277,068

(22) Filed: Oct. 21, 2002

(65) Prior Publication Data

US 2004/0057615 A1    Mar. 25, 2004

(30) Foreign Application Priority Data

Sep. 25, 2002   (EP)   ................... 02368103

(51) Int. Cl.
*G06K 9/00*      (2006.01)
(52) U.S. Cl. ...................... 382/167; 382/274
(58) Field of Classification Search ............... 382/167, 382/274; 348/223.1, 224.1
See application file for complete search history.

(56) References Cited

U.S. PATENT DOCUMENTS

| | | | | |
|---|---|---|---|---|
| 5,659,357 A | * | 8/1997 | Miyano | .................... 348/223.1 |
| 5,805,213 A | * | 9/1998 | Spaulding et al. | ........ 348/222.1 |
| 5,917,556 A | | 6/1999 | Katayama | .................... 348/655 |
| 5,995,142 A | | 11/1999 | Matsufune | ................... 348/223 |
| 6,181,374 B1 | | 1/2001 | Saito et al. | ................. 348/223 |
| 6,201,530 B1 | | 3/2001 | Thadani et al. | ............. 345/150 |
| 6,573,932 B1 | * | 6/2003 | Adams et al. | ........... 348/224.1 |
| 6,947,079 B1 | * | 9/2005 | Parulski et al. | .......... 348/223.1 |
| 2002/0167596 A1 | | 11/2002 | Suzuki et al. | |

FOREIGN PATENT DOCUMENTS

| | | |
|---|---|---|
| EP | 0519761 A2 | 6/1992 |
| EP | 0470769 A1 | 12/1992 |
| JP | 06292221 | 2/1995 |
| JP | 08322061 | 3/1996 |
| JP | 2002 185977 | 6/2002 |

* cited by examiner

*Primary Examiner*—Phuoc Tran
(74) *Attorney, Agent, or Firm*—Saile Ackerman LLC; Stephen B. Ackerman

(57) ABSTRACT

A method and a system for an automatic white balancing of color images being exposed to different illuminants have been achieved. The color information from the sensor color channels is measured and averaged over all pixels belonging to each of the colors of the color array used. The result is equivalent to what color a 1-pixel camera would see if pointed to the same scene. From this "statistical pixel" the ratios of the colors involved are calculated. Pictures taken in different illuminants as e.g. daylight, fluorescent light or incandescent light can then be separated due to their location in different categories in a space defined by said ratios of the colors involved. Each category has predefined white balance factors, which are applied to the image now.

16 Claims, 3 Drawing Sheets

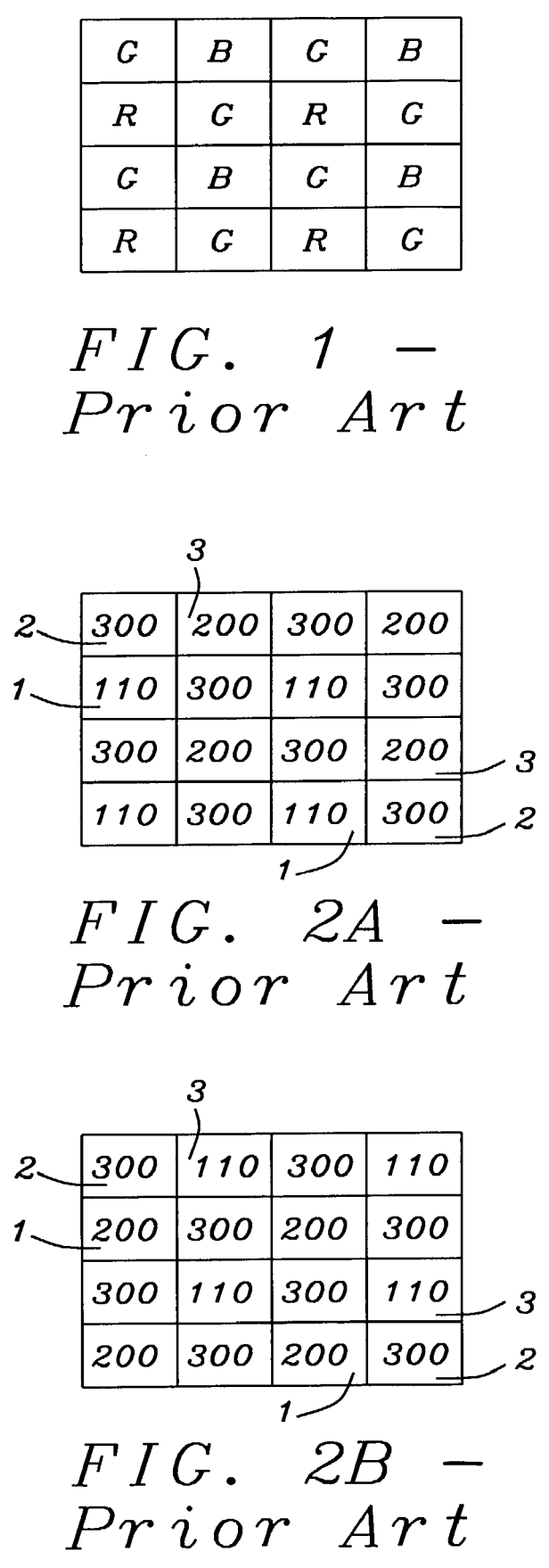

| G | B | G | B |
| R | G | R | G |
| G | B | G | B |
| R | G | R | G |

*FIG. 1 – Prior Art*

| 300 | 200 | 300 | 200 |
| 110 | 300 | 110 | 300 |
| 300 | 200 | 300 | 200 |
| 110 | 300 | 110 | 300 |

*FIG. 2A – Prior Art*

| 300 | 110 | 300 | 110 |
| 200 | 300 | 200 | 300 |
| 300 | 110 | 300 | 110 |
| 200 | 300 | 200 | 300 |

*FIG. 2B – Prior Art*

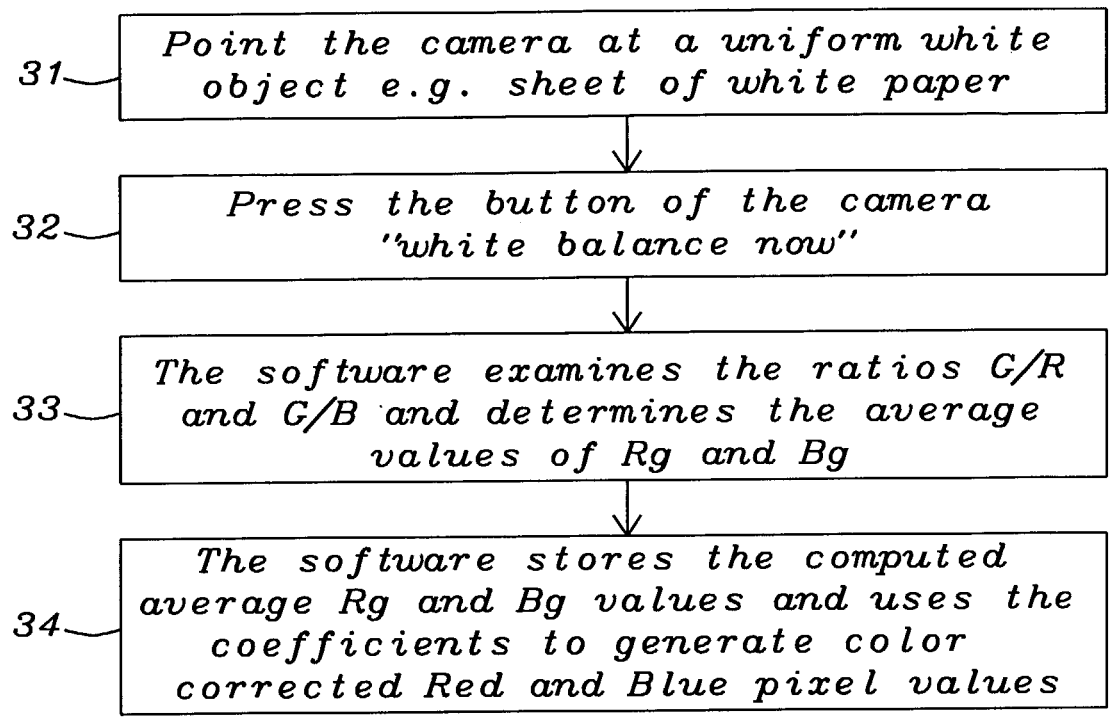
FIG. 3 - Prior Art
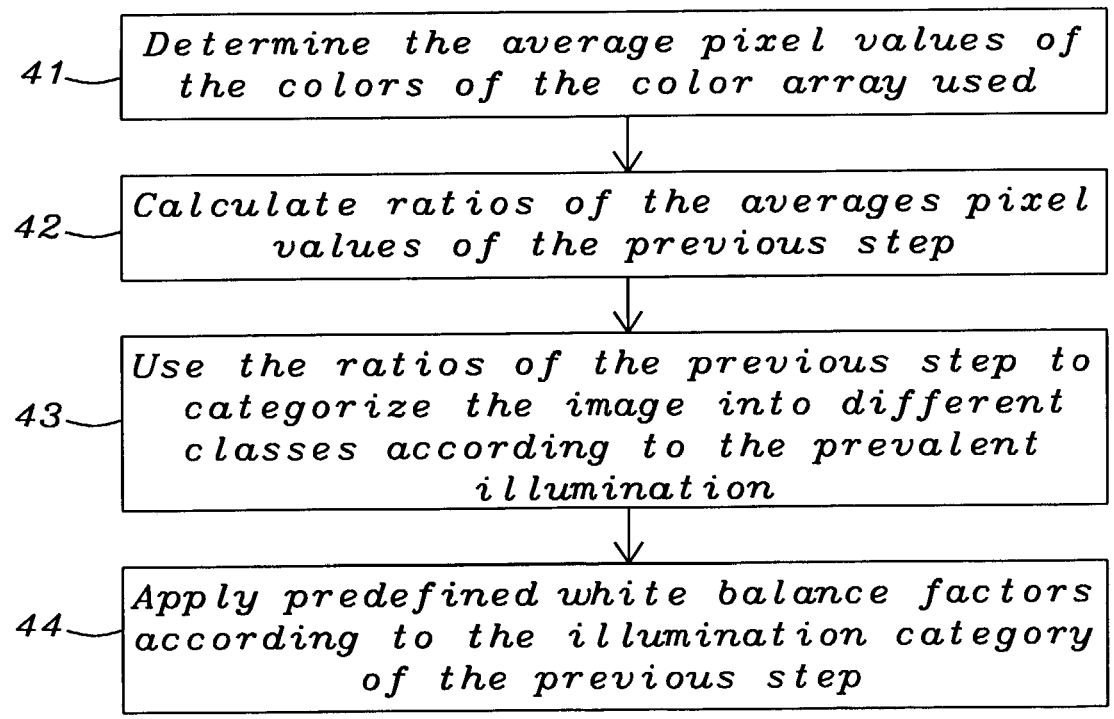
FIG. 4

AUTOMATIC WHITE BALANCE TECHNIQUE

BACKGROUND OF THE INVENTION (1) Field of the Invention

This invention relates generally to color image processing and relates more particularly to a method to identify automatically white balance parameters with a good clustering for different illuminants.

(2) Description of the Prior Art

The human eye adapts to the color temperature of the illumination to some extent and thus gives us similar looking images in different lights. This is not the case with image sensors used in digital cameras. Instead of an adaptation a white balance operation has to be performed. The white balance operation is simply a scaling of the color channels to assure that a grey object remains grey even if the color of the illumination changes. To do this properly a grey object is needed in the scene for calibration, but this is usually not available and there is a need for automatic routines that can deal with this scaling based on the content of any image.

The main difficulty is to extract the relevant information from the current image and not to confuse object color with illumination color. Especially difficult are situations where the colored object, for example a blue sky, covers the whole picture.

The color-filter-array (CFA) of a color imager follows often the commonly used "Bayer" pattern. The pattern of said Bayer CFA is showed in FIG. 1 prior art. Half of the total number of pixels is green (G), while a quarter of the total number is assigned to both red (R) and blue (B).

In order to obtain this color information, the color image pixels are covered with a red, a green, or a blue filter, in a repeating pattern. This pattern, or sequence, of filters can vary, but the widely adopted "Bayer" pattern, which was invented at Kodak, is a repeated 2×2 arrangement as shown in FIG. 1 prior art.

This pattern, showed in FIG. 1 prior art, is based on the premise that the human eye derives most of the luminance data from the green content of a scene; and it is the resolution of this luminance data that is perceived as the "resolution" of an image. Therefore, by ensuring that more of the pixels are "green", a higher resolution image can be created—compared with an alternating R-G-B color filter array with equal numbers of Red, Green and Blue pixels Depending on the "color temperature" of a light source, a white object may generate different values for its R, G and B pixel values. For example, when the camera is pointed at a uniformly diffused white object that fills the entire field of view, the resulting R, G and B values may form the following matrix as shown in FIG. 2A prior art. Using a fluorescent light source the values for Red 1, Green 2 and Blue 3 are

R=110

G=300 and

B=200.

FIG. 2B prior art shows how the values of R and B are changing when incandescent light is used. The new values for Red 1, Green 2 and Blue 3 are

R=200

G=300 and

B=110.

Both cases require correction because a white object should have equal R, G and B data values. The simplest correction would involve "equalizing" the data—if the Green pixel values are kept unchanged and the Red and Blue pixel values are multiplied by appropriate "gain" coefficients.

In the case of the "fluorescent light" example, said gain coefficient Rg (or Red gain) should be 300/110=2.7 and Bg (or Blue Gain) should be 300/200=1.5. In the case of "incandescent light" example, Rg should be 300/200=1.5 and Bg should be 30/110=2.7.

As shown in the above examples, the Rg and Bg coefficients depend on the type or the color temperature of the illumination that is used. Therefore a "white balance" operation is required each time the illumination changes.

A common method in prior art is outlined in FIG. 3 prior art. Step 31 describes that the software of the camera instructs the user to point the camera at a uniform white object e.g. a sheet of white paper. Step 32 illustrates that the button of the camera "white balance now" has to be pressed. In the next step 33 the software examines the ratios G/R and G/B and determines the average values of $R_g$ and $B_g$. In the last step 34 the software stores the computed average $R_g$ and $B_g$ values and uses the coefficients to generate color corrected Red and Blue pixel values.

U.S. Pat. No. (5,917,556 to Katayama) describes a method for correcting a colour video signal for white balance comprising the steps of: providing a digital colour image signal having a sequence of mono-color pixels, wherein each of the pixels represents one colour of first, second, and third different colours, which are repeated in a pre-set pattern; coarse white balancing processing each monocolor pixel for a coarse white balance; spatial processing the sequence of mono-color pixels to produce a sequence of tricolour pixels, wherein each of the tricolour pixels represents the first, second, and third different colours; and colour correction and fine white balancing processing each of the tricolour pixels.

U.S. Pat. No. (5,995,142 to Matsufune) discloses an imaging device including an imaging device for converting an image into a plurality of colour signals each having a signal level; a white balance amplifier for adjusting the signal level of at least one colour signal to produce a plurality of amplified colour signals; a calibration device for calibrating the white balance amplifier and for producing at least one calibration parameter; a detecting device for detecting the amplified colour signals; a calculation device for calculating at least one white balance amplification adjustment; a comparing device for comparing at least one white balance calibration parameter; and an automatic adjustment device for automatically adjusting the white balance amplifier.

U.S. Pat. No. (6,201,530 to Thadani et al.) shows a method for displaying an image to a display device. This method includes sequentially the steps of receiving the image in a first data format, performing a white balance correction in combination with a gamma correction for the image in the first data format, performing a colour correction in combination with a colour space conversion to a second data format for the image, and displaying the image in the second data format to the display device.

SUMMARY OF THE INVENTION

A principal object of the present invention is to achieve a simple and fast automatic white balancing in digital cameras.

A further object of the present invention is to achieve a method how to get white balance parameters with good clustering for different illuminants.

In accordance with the objects of this invention a method for an automatic white balancing of color images for different illuminants has been achieved. First the average pixel values of the colors of the color array used are determined. The next step is to calculate the ratios of the average pixel values of the previous step, followed by using the ratios of the previous step to categorize the image into different classes according to the prevalent illumination, and, finally, apply predefined white balance factors according to the illumination category of the previous step.

In accordance with the objects of this invention a method for an automatic white balancing of color images for different illuminants has been achieved. First the average pixel values of the colors Red, Green and Blue are determined. The next step is to calculate the ratios of the average pixel values of the previous step, followed by using the ratios of the previous step to categorize the image into one of the classes daylight, indoor tungsten light or indoor fluorescent light according to the prevalent illumination, and, finally, apply predefined white balance factors according to the illumination category of the previous step.

In accordance with the objects of this invention a system for an automatic white balancing of color images has been achieved. Said system is comprising a lens, color sensors for each color of the color array used, a non-volatile memory to store the predefined white balance values for different illuminations, an output device; and a processor to perform the processing of the color images.

BRIEF DESCRIPTION OF THE DRAWINGS

In the accompanying drawings forming a material part of this description, there is shown:

FIG. 1 prior art illustrates a Bayer color filter array for digital acquisition of color images.

FIG. 2A prior art shows as example pixel values of a white object in fluorescent light.

FIG. 2 B prior art shows as an example pixel values of a white object in incandescent light.

FIG. 3 prior art shows a flowchart of a method how to achieve white balancing.

FIG. 4 shows a flowchart of a method how to achieve automatic white balancing.

DESCRIPTION OF THE PREFERRED EMBODIMENTS

The preferred embodiments disclose a method and a system to achieve a simple and fast automatic white balancing in digital cameras. A new algorithm has been developed for said purpose. The principle is the following: The color information from the sensor channels is measured and averaged over all pixels. The result is equivalent to what color a 1-pixel camera would see if pointed at the same scene (Red, Green and Blue). From this "statistical pixel" two color indices, describing the ratios between B/R and G/R, are calculated. Pictures taken in daylight, fluorescent and incandescent light can be separated due to their location in the B/R vs G/R space.

FIG. 4 describes the novel method to achieve an automatic white balancing. The first step 41 is to calculate the average values of the colors of a color filter array. In a preferred embodiment an array of Red, Green and Blue has been used. The average values of Red, Green and Blue called $R_{ave}$, $G_{ave}$ and $B_{ave}$ within the total image are computed according the following equations:

$$R_{ave} = \Sigma R_{ij}/N_r,$$

$$G_{ave} = \Sigma G_{ij}/N_g,$$

and $$B_{ave} = \Sigma B_{ij}/N_b,$$

wherein $N_r$ equals the total number of red pixels in the image, $N_g$ equals the total number of green pixels and $N_b$ equals the number of blue pixels, $R_{ij}$ equals the Red pixel value of the co-ordinates I, j within the color filter array. $G_{ij}$ and $B_{ij}$ correspond to the Green and Blue pixel values.

In the next step 42 ratios of said average values of the colors according to the color scheme used are calculated. In a preferred embodiment using the R, G and B scheme said ratios are $$A = \frac{B_{ave}}{R_{ave}} \text{ and } B = \frac{G_{ave}}{R_{ave}}.$$

In the following step 43 said ratios are used to categorize the image into different classes according to the prevalent illumination.

Figure 5:
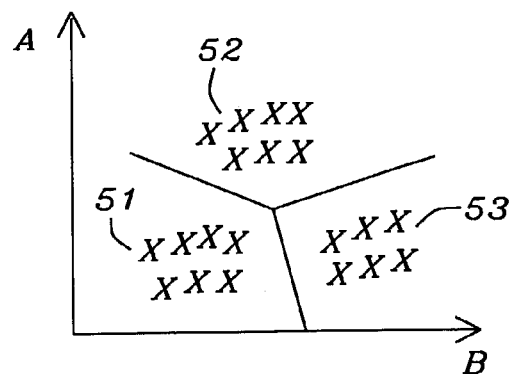
FIG. 5 shows different classes of an image according to different prevalent illumination as function of the ratios of average pixel values of the colors of the color array used.

FIG. 5 shows as example principal categories or classes of illumination. According to said ratios A and B the image can be categorized in a preferred embodiment into three classes, shown in the FIG. 5. The class 51 belongs to category "daylight", the class 52 belongs to category "indoor tungsten" and the class 53 belongs to a category "indoor fluorescent". Each class has specific predefined white balance factors according to the prevalent illumination of said class. The boundaries of said categories depend upon which optics has been used and upon which type of camera has been used.

In step 44 of FIG. 4 said predefined white balance factors according to the illumination category of the previous step are applied to balance the colors of the picture.

Figure 6:
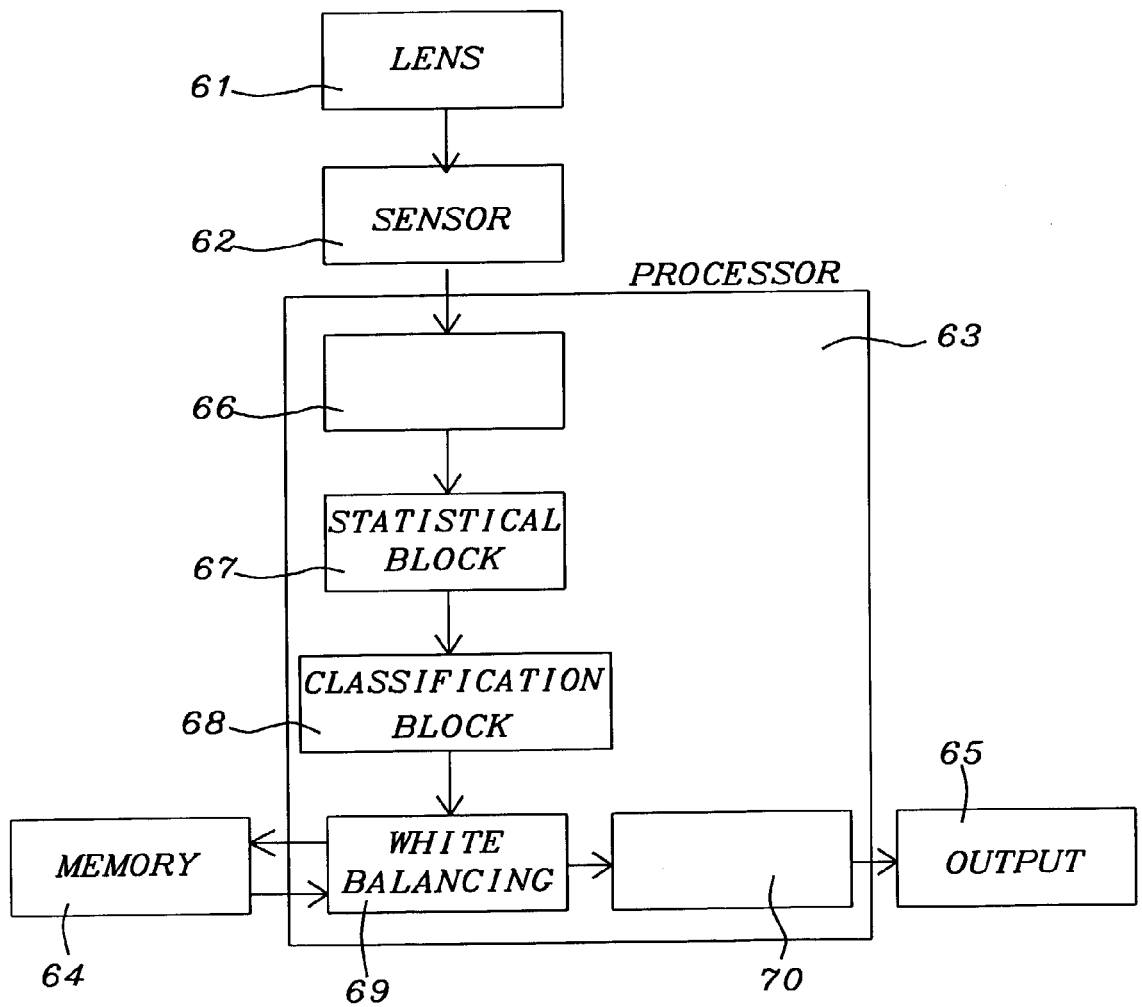
FIG. 6 shows a general block diagram of a digital camera using automatic white balancing technique

FIG. 6 shows a general system block diagram of a digital camera with an automatic white balancing system based on the invention. Said system comprises a lens 61, the CMOS/CCD sensors 62, a processor 63 running software, a non-volatile memory 64 and an output device 65. Said processor 63 comprises a block for other color and image processing 66, a statistical block 67 wherein the average pixel values of e.g. $R_{ave}$, $B_{ave}$ and $G_{ave}$ and the related ratios are being computed, a classification block 68, the block performing the white balancing 69 and a block 70 for other processing, e.g. the compression of the data of the image to e.g. the JPEG format. Said non-volatile memory 64 stores the white balancing factors of all illumination categories. Said classification block 68 determines the illumination category of a picture and which related factors are to get from the non-volatile memory 64. Said white balancing block 69 is performing the calculation of the modified pixel values of the image using the predefined white balance factors stored in the memory 64 according to the step 44 of the method outlined in FIG. 4.

While the invention has been particularly shown and described with reference to the preferred embodiments thereof, it will be understood by those skilled in the art that various changes in form and details may be made without departing from the spirit and scope of the invention.

What is claimed is:

1. A method for an automatic white balancing of color images for different illuminants comprising:
   determine the average pixel values of the colors of the color array used;
   calculate ratios of the average pixel values of the previous step;
   use the ratios of the previous step to categorize the image into different classes according to a prevalent illumination; and
   apply predefined white balance factors according to the illumination category of the previous step.

2. The method of claim 1 wherein said colors of the color array used are Red, Green and Blue.

3. The method of claim 1 wherein said different classes are two classes for daylight, and indoor tungsten light.

4. The method of claim 1 wherein said different classes are two classes for daylight, and indoor fluorescent light.

5. The method of claim 1 wherein said different classes are two classes for indoor tungsten and indoor fluorescent light.

6. The method of claim 1 wherein said different classes are three classes for daylight, indoor tungsten light and indoor fluorescent light.

7. The method of claim 1 wherein more than three classes of illumination are categorized.

8. A method for an automatic white balancing of color images for different illuminants comprising:
   determine the average pixel values of the colors Red, Green and Blue;
   calculate ratios of the average pixel values of the previous step;
   use the ratios of the previous step to categorize the image into one of the classes daylight, indoor tungsten light or indoor fluorescent light according to a prevalent illumination; and
   apply predefined white balance factors according to the illumination category of the previous step.

9. The method of claim 8 wherein said average pixel values are calculated for the colors Red, Green and Blue using the equations:

$$R_{ave} = \Sigma R_{ij}/N_r,$$

$$G_{ave} = \Sigma G_{ij}/N_g,$$

and $$B_{ave} = \Sigma B_{ij}/N_b,$$

wherein $N_r$ equals the total number of red pixels in the image, $N_g$ equals the total number of green pixels and $N_b$ equals the number of blue pixels, $R_{ij}$ equals the Red pixel value of the co-ordinates l, j within the color filter array, $G_{ij}$ and $B_{ij}$ correspond to the Green and Blue pixel values.

10. The method of claim 8 wherein said ratios of the average pixel values are $$A = \frac{B_{ave}}{R_{ave}} \text{ and } B = \frac{G_{ave}}{R_{ave}}$$

wherein $B_{ave}$ is the average pixel value of the color Blue, $G_{ave}$ is the average pixel value of the color Green and $R_{ave}$ is the average pixel value of the color Red.

11. The method of claim 8 wherein said categorization of the illumination of the images is performed on the basis of said ratios of the average pixel values using a two-dimensional space having as co-ordinates said ratios of the average pixel values.

12. A system for an automatic white balancing of color images comprising:
   a lens;
   color sensors for each color of the color array used;
   a non-volatile memory to store predefined white balance values for different illuminations;
   an output device; and
   a processor to perform the processing of the color images wherein said processor comprises:
      a statistical block wherein the average pixel values of selected color arrays and related ratios are being computed;
      a classification block to determine, based on said related ratios, an illumination category of a color picture and related white balance values from said non-volatile memory;
      a white balancing block to perform the white balancing calculation of the pixels of the color image using said white balance values from said non-volatile memory;
      a color and image processing block performing other image processing functions; and
      another image processing block.

13. The system of claim 12 wherein the color array used is Red, Green and Blue.

14. The system of claim 12 wherein the selected color array is Red, Green and Blue.

15. The system of claim 12 wherein said average pixel values computed by the statistical block are $$R_{ave} = \Sigma R_{ij}/N_r,$$

$$G_{ave} = \Sigma G_{ij}/N_g,$$

and $$B_{ave} = \Sigma B_{ij}/N_b,$$

wherein $N_r$ equals the total number of red pixels in the image, $N_g$ equals the total number of green pixels and $N_b$ equals the number of blue pixels, $R_{ij}$ equals the Red pixel value of the co-ordinates l, j within the color filter array, $G_{ij}$ and $B_{ij}$ correspond to the Green and Blue pixel values.

16. The system of claim 12 wherein said ratios of the average pixel values are $$A = \frac{B_{ave}}{R_{ave}} \text{ and } B = \frac{G_{ave}}{R_{ave}}$$

wherein $B_{ave}$ is the average pixel value of the color Blue, $G_{ave}$ is the average pixel value of the color Green and $R_{ave}$ is the average pixel value of the color Red.

* * * * *